United States Patent
Miksa et al.

(10) Patent No.: US 9,880,010 B2
(45) Date of Patent: Jan. 30, 2018

(54) METHOD OF AND ARRANGEMENT FOR MAPPING RANGE SENSOR DATA ON IMAGE SENSOR DATA

(75) Inventors: Krysztof Miksa, Lodz (PL); Rafal Jan Gliszczynski, Lodz (PL); Lukasz Piotr Taborowski, Lask (PL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 624 days.

(21) Appl. No.: 12/734,097

(22) PCT Filed: Nov. 7, 2007

(86) PCT No.: PCT/NL2007/050541
§ 371 (c)(1),
(2), (4) Date: Jul. 9, 2010

(87) PCT Pub. No.: WO2009/061174
PCT Pub. Date: May 14, 2009

(65) Prior Publication Data
US 2010/0296705 A1 Nov. 25, 2010

(51) Int. Cl.
*G01C 21/28* (2006.01)
*G01C 21/00* (2006.01)
(Continued)

(52) U.S. Cl.
CPC .............. *G01C 21/28* (2013.01); *G01C 11/02* (2013.01); *G01C 21/00* (2013.01); *G06T 5/003* (2013.01);
(Continued)

(58) Field of Classification Search
CPC ........ G01C 11/02; G01C 21/00; G01C 21/28; G06T 5/003; G06T 5/005; G06T 2207/30252
See application file for complete search history.

(56) References Cited

U.S. PATENT DOCUMENTS 5,034,986 A * 7/1991 Karmann et al. ............. 382/103
7,187,809 B2 * 3/2007 Zhao et al. .................... 382/285
(Continued)

FOREIGN PATENT DOCUMENTS

EP 1 148 444 10/2001
EP 1462762 9/2004
(Continued)

OTHER PUBLICATIONS

Machine translation of JP2005286468A.*
(Continued)

*Primary Examiner* — Katrina Fujita

(57) ABSTRACT

A method of and arrangement for mapping first range sensor data from a first range sensor to image data from a camera are disclosed. In at least one embodiment, the method includes: receiving time and position data from a position determination device on board a mobile system, as well as the first range sensor data from the first range sensor on board the mobile system and the image data from the camera on board the mobile system; identifying a first points cloud within the first range sensor data, relating to at least one object; producing a mask relating to the object based on the first points cloud; mapping the mask on object image data relating to the same object as present in the image data from the at least one camera; and performing a predetermined image processing technique on at least a portion of the object image data.

19 Claims, 14 Drawing Sheets

(51) Int. Cl.
  *G01C 11/02* (2006.01)
  *G06T 5/00* (2006.01)
(52) U.S. Cl.
  CPC .... *G06T 5/005* (2013.01); *G06T 2207/30252* (2013.01)

(56) References Cited

U.S. PATENT DOCUMENTS

| | | | |
|---|---|---|---|
| 7,643,669 B2* | 1/2010 | Strassenburg-Kleciak et al. | 382/154 |
| 7,825,950 B2* | 11/2010 | Rottmann | 348/143 |
| 7,940,302 B2* | 5/2011 | Mehrotra et al. | 348/156 |
| 8,098,282 B2* | 1/2012 | Gopinath et al. | 348/143 |
| 8,126,190 B2* | 2/2012 | Jung | G06K 9/3241 382/100 |
| 8,203,609 B2* | 6/2012 | Jung | H04N 1/0084 348/143 |
| 8,212,872 B2* | 7/2012 | Sablak | G06T 3/00 348/143 |
| 2003/0108240 A1* | 6/2003 | Gutta | G06T 5/002 382/181 |
| 2003/0137589 A1* | 7/2003 | Miyata | 348/211.7 |
| 2004/0051711 A1 | 3/2004 | Dimsdale | |
| 2004/0105573 A1* | 6/2004 | Neumann et al. | 382/103 |
| 2006/0064384 A1* | 3/2006 | Mehrotra | G01S 3/7864 705/57 |
| 2006/0152522 A1 | 7/2006 | Strawwenburg-Kleciak | |
| 2007/0201694 A1* | 8/2007 | Bolle et al. | 380/205 |
| 2008/0221843 A1* | 9/2008 | Shenkar et al. | 703/1 |
| 2009/0323121 A1* | 12/2009 | Valkenburg et al. | 358/1.18 |
| 2010/0080415 A1* | 4/2010 | Qureshi et al. | 382/103 |
| 2010/0091020 A1* | 4/2010 | Kmiecik et al. | 345/427 |

FOREIGN PATENT DOCUMENTS

| | | | | |
|---|---|---|---|---|
| JP | 144719 A | 5/2004 | | |
| JP | 286468 A | 10/2005 | | |
| JP | 2005286468 A | * 10/2005 | | G06T 1/00 |
| JP | 178825 A | 7/2006 | | |
| WO | WO 98/12504 | 3/1998 | | |
| WO | WO 2008/048088 | 4/2008 | | |

OTHER PUBLICATIONS

Jensen et al., "Laser Range Imaging using Mobile Robots: From Pose Estimation to 3d-Models", 2005, Proc. 1st Range Imaging Research Day.*
Besl. et al., "A Method for Registration of 3-D Shapes", 1992, Proc. SPIE 1611, Sensor Fusion IV: Control Paradigms and Data Structures, 586-606.*
Ozden et al., "Reconstructing 3D trajectories of independently moving objects using generic constraints", Computer Vision and Image Understanding 96 (2004) 453-471.*
Rong et al. "The Optical Flow Estimation with Displacement Compensation for High-speed Motion" IEEE 2002 International Conference on Communications,Circuits and Systems, vol. 1, 595-599.*
EPO Machine translation of JP2005286468.*
Huijing Zhao et al., "Updating a Digital Geographic Database Using Vehicle-borne Laser Scanners and Line Cameras," Photogrammetric Engineering & Remote Sensing, vol. 71, No. 4, Apr. 2005, pp. 415-424.
Kiichiro Ishikawa et al., "A Mobile Mapping System for road data capture based on 3D road model," Proceedings of the 2006 IEEE International Conference on Control Applications, Oct. 4, 2006, pp. 367-371.

* cited by examiner 3D mass center 3D cylinder wrapper

METHOD OF AND ARRANGEMENT FOR MAPPING RANGE SENSOR DATA ON IMAGE SENSOR DATA

FIELD OF THE INVENTION

The present invention relates to the field of capturing and processing images and range sensors data with an image sensor like a camera on a moving vehicle such as a mobile mapping system (MMS), and mapping these data on range sensor data obtained by at least one range sensor located on the same moving vehicle.

In an embodiment, the invention also relates to the field of removing privacy sensitive data from such images. The privacy sensitive data may relate to objects that are moving relative to the fixed world (i.e., the globe).

BACKGROUND OF THE INVENTION

In some MMS applications, the intention is to capture especially pictures of building facades and other fixed objects, like trees, street signs and street lamps, that are later used in "real-world" 2D and/or 3D images of streets used in e.g. car navigation systems. Then, these images are shown to drivers of a car provided with such a navigation system such that the driver sees 2D and/or 3D images on a screen of the navigation system corresponding with the real world view when looking through the windows of the car. Such pictures may also be used in other applications than car navigation systems, for instance, in games that can be played on computers either as a stand alone systems or as cooperating in a networked environment. Such an environment may be the Internet. The solution of the present invention as presented below is not restricted to a specific application.

However, millions of such MMS images may contain privacy information such as faces of people and readable license plates of cars that are unintentionally present on the images. It is desirable not to use such images in public applications with such privacy or other undesired information still intact. For instance, newspapers have reported about such undesired information being present in images used in street map views distributed by Google™. Images taken in a real world condition represent static and moving objects in the vicinity of the MMS. In the images, the objects having such privacy or other undesired information may be static or moving relative to the fixed world. One has to identify such objects in the images taken by the camera on the MMS. Some prior art applications have tried to identify moving objects only on the basis of image properties and determine their trajectory of movement based on color pixel properties in sequences of images. However, such an approach works only as long as objects can be determined on more then two images in sequence to determine the trajectory.

Others have disclosed systems in which other types of sensors are used to determine short time trajectory approximation of objects relative to a vehicle arranged with such sensors. Such sensors may include laser scanners, radar systems and stereo-video cameras. Such systems are, for instance, referred to in the introduction of EP 1 418 444. This document relates to real-time applications where relative positions and speeds of objects to the vehicle are important, for instance, in order to avoid accidents between the vehicle and the objects. The document does not disclose how the position and speed data obtained by the sensors can be mapped on image data obtained by the stereo-video cameras. Moreover, it does not disclose how to determine absolute positions and absolute speeds of such objects. Here, "absolute" is to be understood in the sense of being absolute relative to the fixed real world as determined by the earth and objects fixed to the earth, like buildings, traffic signs, trees, mountains, etc. Such a real world can be, for instance, defined by a reference grid as used by the GPS system. Moreover, this document does not address how to deal with privacy sensitive data in images taken by the video cameras.

Using laser scanner data to assist in identifying locations of building footprints is for example described in co-pending patent application PCT/NL2006/050264.

SUMMARY OF THE INVENTION

It is an object of the present invention to provide a system and a method allowing the accurate detection of objects present in a series of images taken by one or more cameras taking pictures as they are moving, for instance because they are located on a mobile mapping system.

To that effect, the invention provides a computer arrangement comprising a processor and memory connected to the processor, the memory comprising a computer program comprising data and instructions arranged to allow said processor to:
  receive time and position data from a position determination device on board a mobile system, as well as first range sensor data from at least a first range sensor on board said mobile system and image data from at least one camera on board said mobile system;
  identify a first points cloud within said first range sensor data, relating to at least one object;
  produce a mask relating to said object and based on said first points cloud;
  map said mask on object image data relating to said same object as present in said image data from said at least one camera;
  perform a predetermined image processing technique on at least a portion of said object image data.

The position data may contain orientation data.

The range sensor provides such points clouds relating to different objects. As objects are not located on the same location, points relating to each of such points clouds show a clear different distance and/or bearing to the range sensor depending on to what object they belong. So, using these differences in range relative to the range sensor, masks relating to different objects can be easily made. Then these masks can be applied to the image as taken by the camera to identify objects in the image. This turns out to be a reliable way of identifying those objects and easier than relying on image data only.

Such a method proves to work quite well if the object is not moving relative to the fixed world. However, such objects may be moving. Then, the accuracy of such a detection is reduced. Therefore, in an embodiment, the present invention relates to a computer arrangement as defined above, wherein said computer program is arranged to allow said processor to:
  receive second range sensor data from a second range sensor on board said mobile system;
  identify a second points cloud within said second range sensor data, relating to said same at least one object;
  calculate a motion vector for said at least one object from said first and second points clouds;
  map said mask on said object image data while using said motion vector.

In this embodiment, the system determines an absolute position and absolute speed of the object at the time the images were taken, and the system uses a short time approximation of the trajectory of movement of the object. I.e., since the time period involved between successive images and successive range sensor scans is very short, one may assume that all motions are approximately linear and the objects that are moving relative to the fixed world can be identified very accurately. To that effect it uses the range sensor scans of at least two range sensors that, since they are spaced apart and oriented differently, provide data that can easily be used to identify locations and movements of objects. This reduces problems relating to identifying moving objects only on the basis of image properties and determine their trajectory of movement based on color pixel properties in sequences of images, as known from the prior art.

Moreover, when using very precise methods to determine the absolute position and speed of the MMS system that is supporting the camera and the sensors, it is also possible to obtain a very precise absolute position and short time trajectory estimation of at least a point of the object in the vicinity of the MMS system that are present on images taken by the camera. This allows for the reconstruction of 3D positions of images pixels that improves the value of such images and allows for an improved reconstruction of objects present in a so-called road corridor as seen by a driver of a vehicle. Not only image filtering techniques can be used but also spatial features can be added like space separation, real size, variance of size to approximate a main axis of the object or a reference point of the object. This increases the value of filtering.

By adding 3D spatial aspect to images, i.e., by adding a z-component to objects in images, even objects with the same color space properties (for instance, near bush from far trees) can be effectively separated.

Pixels can be associated with locations in (absolute) space. By doing so, results of one image analysis and filtering, like face detection or text detection, can be easily transferred and applied to other images with the same mapping to absolute space.

In some cases a ROI (Regions of Interest) on one image with not readable properties can be selected and be used to determine the same properties in an ROI of an other image. For instance, ROIs of two or more different images can be mapped to the same ROI in space and properties from an second image can be applied to an image taken earlier or later in time. So, using range sensor measurements can link algorithms performed on a plurality of images The principles of the invention can be applied while using any type of range sensors, for instance, laser scanner, radar or Lidar. The images can be taken by any type of camera carried by any suitable vehicle including air borne vehicles.

The camera on the MMS system may take consecutive pictures in time such that it renders several pictures with overlapping portions of the same scene. In such overlapping portions an object may be present which, therefore, will show up in several pictures. If an image filtering technique is to be applied on such an object, using the method of the invention such technique need only be applied on the object in one of these pictures (typically the one taken first in time). This will result in an image processed object that can be used in all pictures it is present in. This saves significant computing time.

When the speed of the object is large relative to the speed of the camera, an important factor is the observed size of the object since the larger the speed difference between the two, the more the observed size deviates from the real size. So, if one wishes to map the range sensor data on the image data this effect has to be compensated for. Therefore, in a further embodiment, the object's size is determined from short time trajectory data. In this embodiment, the short time approximation of the trajectory of movement of the object allows the computer arrangement to apply a shape correction procedure to point clouds associated with (fast) moving objects as obtained by the range sensors resulting in a better correspondence between such point clouds and the objects in the images taken by the camera(s).

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show.

DETAILED DESCRIPTION OF EMBODIMENTS

The present invention mainly relates to the field of processing images taken by cameras on a Mobile Mapping Systems (MMS). More specifically, in some embodiments, the invention relates to enhancing such images or the identification of (moving) objects in such images, as well as eliminating privacy sensitive data in these images. However, other applications covered by the scope of the appended claims are not excluded. For instance, the camera(s) may be carried by any other suitable vehicle like airborne vehicles.

Figure 1:
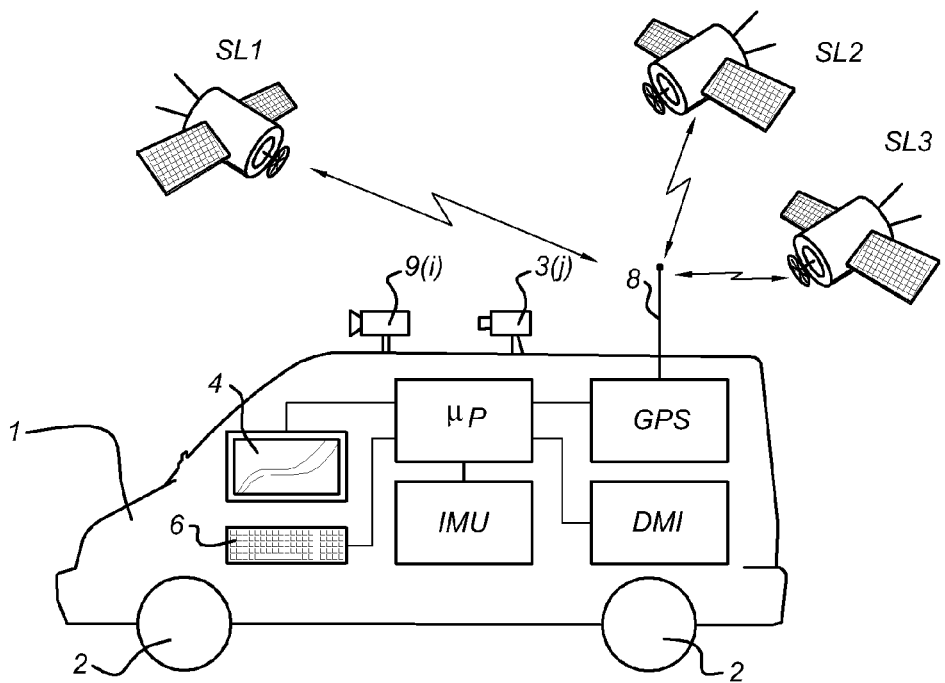
FIG. 1 shows a MMS system with a camera and a laser scanner.

FIG. 1 shows a MMS system that takes the form of a car 1. The car 1 is provided with one or more cameras 9(I), I=1, 2, 3, . . . I, and one or more laser scanners 3(j), j=1, 2, 3, . . . J. In the context of the present invention, if moving objects have to be identified, information from at least two or more laser scanners 3(j) is used. The car 1 can be driven by a driver along roads of interest. The laser scanners 3(j) can be substituted by any kind of range sensor that allows, for some set of bearings, a detection of a distance between the range sensor and an object sensed by the range sensor. Such an alternative range sensor can, for instance be a radar sensor or a Lidar sensor. If a radar sensor is used its range and bearing measurement data should be comparable to those as can be obtained with a laser scanner.

The term "camera" is understood here to include any type of image sensor, including for instance a Ladybug™.

The car 1 is provided with a plurality of wheels 2. Moreover, the car 1 is provided with a high accuracy position/orientation determination device. Such a device is arranged to provide 6 degree of freedom data as to position and orientation of the car 1. An embodiment is shown in FIG. 1. As shown in FIG. 1, the position/orientation determination device comprises the following components:

- a GPS (global positioning system) unit connected to an antenna 8 and arranged to communicate with a plurality of satellites SLk (k=1, 2, 3, . . . ) and to calculate a position signal from signals received from the satellites SLk. The GPS unit is connected to a microprocessor μP. The microprocessor μP is arranged to store the data received from the GPS unit as a function of time. Such data will be sent to an external computer arrangement for further processing. In an embodiment, based on the signals received from the GPS unit, the microprocessor μP may determine suitable display signals to be displayed on a monitor 4 in the car 1, informing the driver where the car is located and possibly in what direction it is traveling. The microprocessor μP is arranged to receive input using a keyboard 6.
- a DMI (Distance Measurement Instrument). This instrument is an odometer that measures a distance traveled by the car 1 by sensing the number of rotations of one or more of the wheels 2. The DMI is also connected to the microprocessor μP. The microprocessor μP is arranged to store the data received from the DMI as a function of time. Such data will also be sent to the external computer arrangement for further processing. In an embodiment, the microprocessor μP takes the distance as measured by the DMI into account while calculating the display signal from the output signal from the GPS unit.
- an IMU (Inertial Measurement Unit). Such an IMU can be implemented as three gyro units arranged to measure rotational accelerations and three translational accelerators along three orthogonal directions. The IMU is also connected to the microprocessor μP. The microprocessor μP is arranged to store the data received from the IMU as a function of time. Such data will also be sent to the external computer arrangement for further processing.

The system as shown in FIG. 1 collects geographic data, for instance by taking pictures with one or more camera(s) 9(i) mounted on the car 1. The camera(s) are connected to the microprocessor μP. Moreover, the laser scanners 3(j) take laser samples while the car 1 is driving along roads of interest. The laser samples, thus, comprise data relating to the environment associated with these roads of interest, and may include data relating to building blocks, to trees, traffic signs, parked cars, people, etc.

The laser scanners 3(j) are also connected to the microprocessor μP and send these laser samples to the microprocessor μP.

It is a general desire to provide as accurate as possible location and orientation measurements from the three measurement units: GPS, IMU and DMI. These location and orientation data are measured while the camera(s) 9(i) take pictures and the laser scanners 3(j) take laser samples. Both the pictures and the laser samples are stored for later use in a suitable memory of the microprocessor μP in association with corresponding location and orientation data of the car 1 at the time these pictures and laser samples were taken. An alternative way of correlating all data from the GPS, IMU, DMI, camera(s) 9(i) and laser scanners 3(j) in time is to time stamp all these data and store the time stamp data in conjunction with the other data in the microprocessor's memory. Other time synchronization markers can be used instead.

The pictures and laser samples include information, for instance, as to building block façades. In an embodiment, the laser scanner(s) 3(j) are arranged to produce an output with minimal 50 Hz and 1 deg resolution in order to produce a dense enough output for the method. A laser scanner such as MODEL LMS291-S05 produced by SICK is capable of producing such output.

Figure 2:
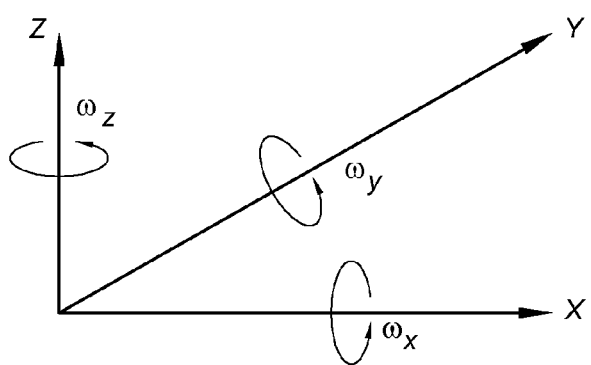
FIG. 2 shows a diagram of location and orientation parameters.

FIG. 2 shows which position signals can be obtained from the three measurement units GPS, DMI and IMU shown in FIG. 1. FIG. 2 shows that the microprocessor μP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector.

Figure 3:
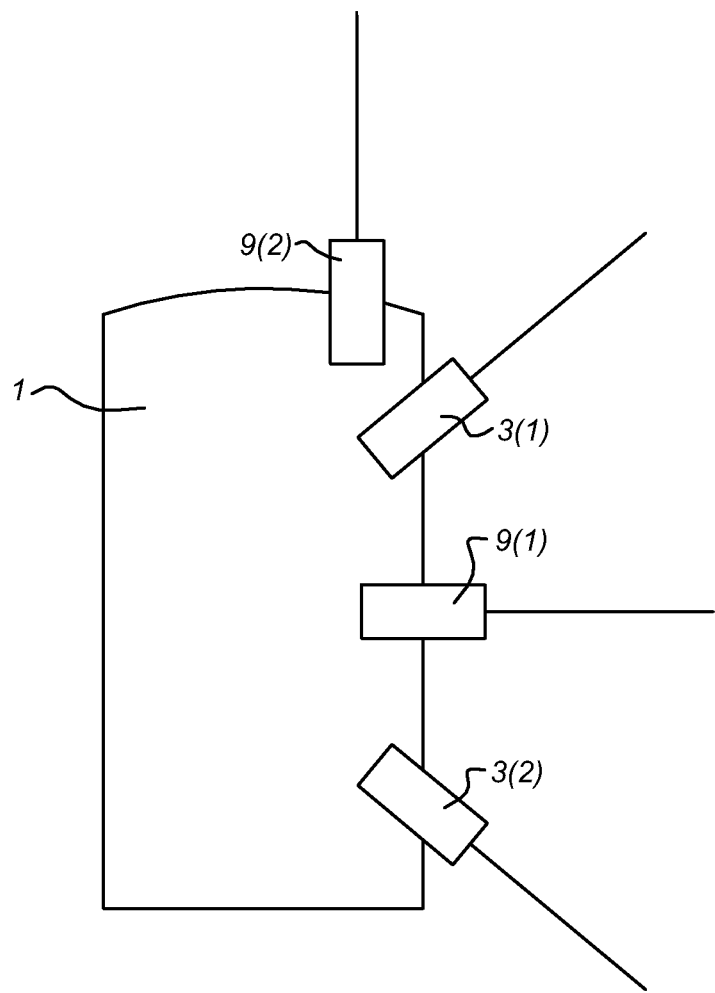
FIG. 3 shows a schematic top view of a car provided with two cameras and two range sensors on its roof.

FIG. 3 shows the MMS with two range sensors 3(1), 3(2) (that may be laser scanners but, alternatively, may for instance be radars), and two cameras 9(1), 9(2). The two range sensors 3(1), 3(2) are arranged on the roof of the car 1 such that they are directed towards a right side of the car 1 as viewed relative to a driving direction of the car 1. The scanning direction of range sensor 3(1) is indicated with SD1 whereas the scanning direction of range sensor 3(2) is indicated with SD2. The camera 9(1) is viewing to the right side too, i.e., it may be directed perpendicular to the driving direction of car 1. The camera 9(2) is viewing in the driving direction. This setup is suitable for all those countries where vehicles drive in right lanes. The setup is preferably changed for those countries where vehicles drive on the left side of the street in the sense that the camera 9(1) and the laser scanners 3(1), 3(2) are located on the left side of the car's roof (again "left" being defined relative to the driving direction of car 1). It should be understood that many other configurations could be used by one skilled in the art.

The microprocessor in the car 1 may be implemented as a computer arrangement. An example of such a computer arrangement is shown in FIG. 4a.

Figure 4A:
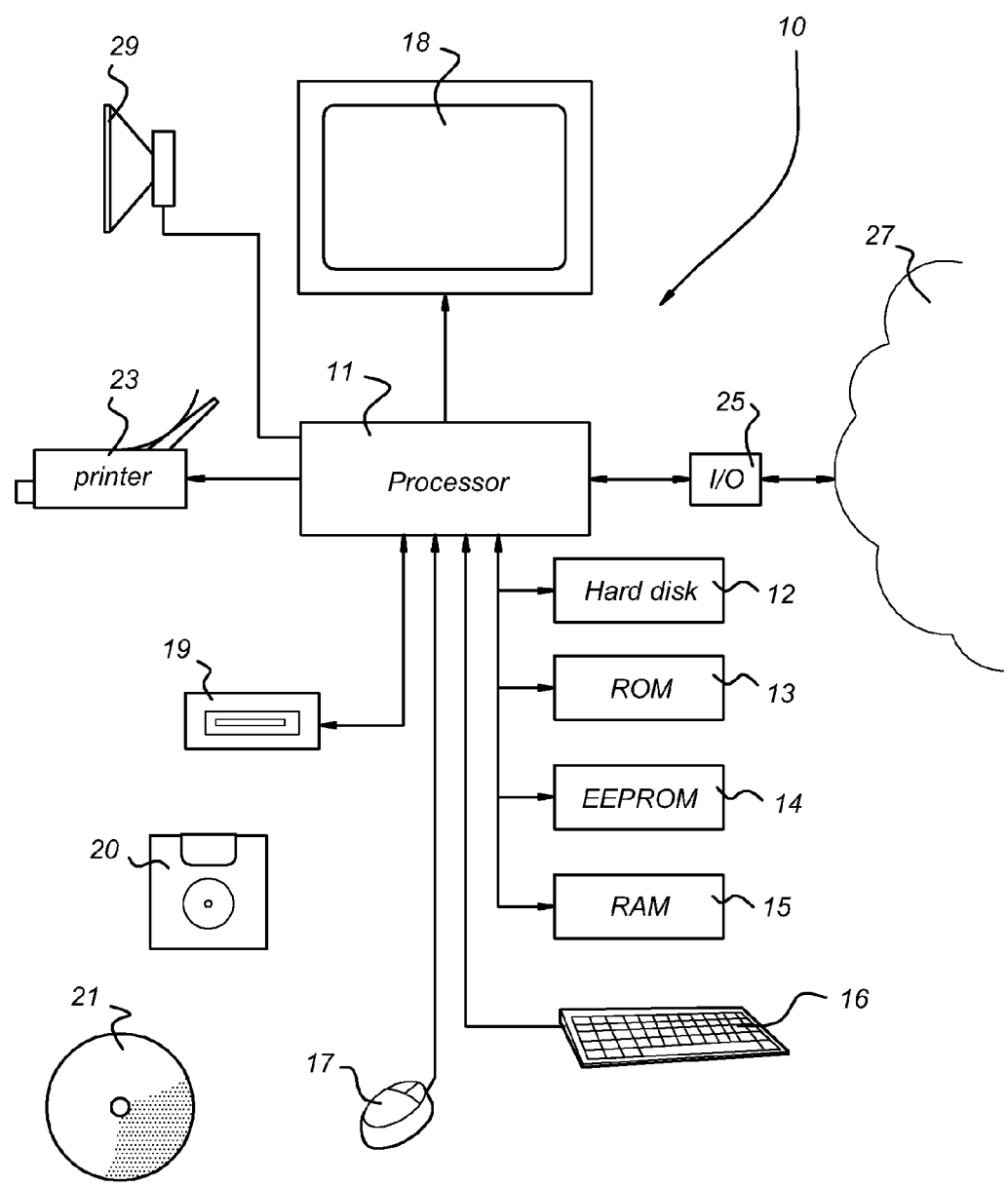
FIG. 4a shows a diagram of a computer arrangement with which the invention can be performed.

In FIG. 4a, an overview is given of a computer arrangement 10 comprising a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27. These connections may not all be connected in real time as the vehicle collects data while moving down the streets.

The data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that when applied in the car 1 the computer arrangement does not need to have all components shown in FIG. 4a. For instance, the computer arrangement does not need to have a loudspeaker and printer then. As for the implementation in the car 1, the computer arrangement needs at least processor 11, some memory to store a suitable program and some kind of interface to receive instructions and data from an operator and to show output data to the operator.

For post-processing the pictures, scans and stored position and orientation data as taken by the camera(s) 9(i), the laser scanner(s) 3(j) and the position/orientation measurement devices, respectively, a similar arrangement as the one shown in FIG. 4a will be used, be it that that one will not be located in the car 1 but may conveniently be located in a building for off-line post-processing. The pictures, scans, and position/orientation data as taken by camera(s) 9(i), scanner(s) 3(j) and position/orientation measurement devices are stored in one of the memories 12-15. That can be done via storing them first on a DVD, memory stick or the like, or transmitting them, possibly wirelessly, from the memory 12, 13, 14, 15. All measurements are preferably also time stamped and these various time measurements are stored as well.

In an embodiment of the invention, the arrangement shown in FIG. 1 should be able to distinguish certain objects in the images taken by the camera 9(i). Their absolute position and, optionally, their absolute speed at the time the images were taken should be determined as accurate as possible. For instance, they should be identified so as to process at least portions of them such that the processed portions are no longer clearly visible to a viewer. Such portions may for instance relate to human faces, car license numbers, political statements in billboards, commercial announcements, trademark names, recognizable characteristics of copyrighted objects, etc. One action during the processing of the images may be to disregard data relating to building façades in the images taken by the camera 9(i). I.e., the data relating to the building façades remains unchanged in the eventual application. Location data as to where such building façades are can be obtained by using a method described and claimed in co-pending patent application PCT/NL2006/050264. Other techniques to identify the location of building façades can, of course, be used within the context of the present invention. In the event such building façade data is removed, removing privacy sensitive data will relate to objects present between the mobile mapping system and such façades only.

Such objects may be moving relative to the fixed world. Such moving objects may be people and cars. Identifying moving objects in images may be more difficult than identifying fixed objects. By using only one laser scanner 3(j), one can identify non-moving objects and properly map them to images but it is very difficult to identify moving objects properly in images and then process portions of them. Therefore, in the embodiments relating to objects having a certain speed the invention relates to a MMS with one or more cameras 9(i) and two or more laser scanners 3(j). Then, two point clouds of the same object but as generated from the two different laser sensors 3(j) are used to determine a short time trajectory of the moving object which will be used to estimate the position of the object as a function of time. Such an estimate of the position of the object as a function of time will then be used to identify the object in images collected by the camera(s) 9(i) in a time period that also laser scanner data was collected.

The computer arrangement as shown in FIG. 4a is programmed to provide a certain functionality in accordance with the invention. The invention covers at least two aspects: functionality relating to non-moving objects and functionality relating to moving objects. The functionality relating to non-moving objects is summarized in a flow chart presented in FIG. 4b whereas the functionality relating to moving objects is summarized in a flow chart presented in FIG. 14.

Figure 4B:
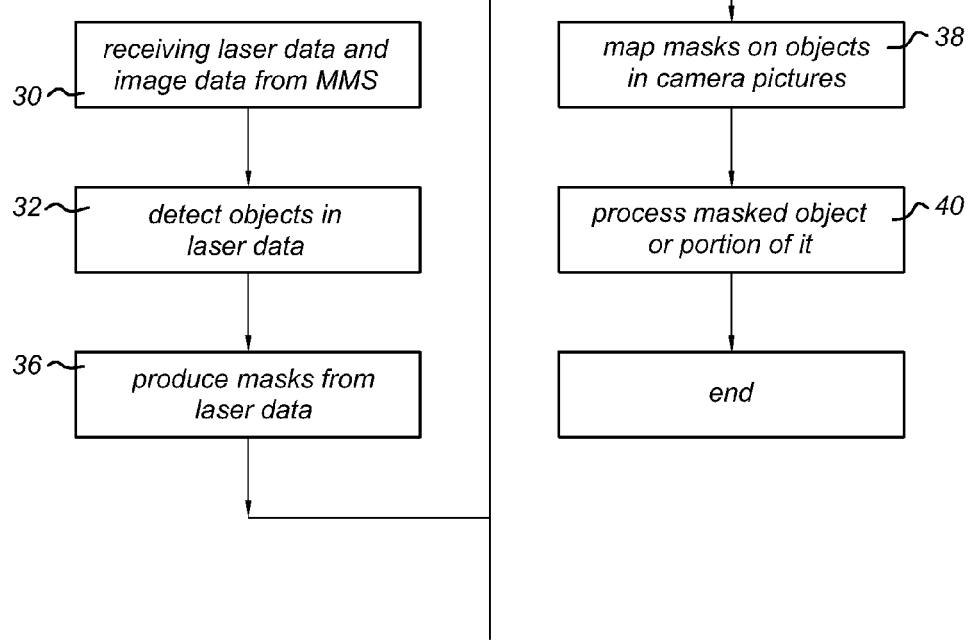
FIG. 4b shows a flow chart of a basic process in accordance with an embodiment of the invention.

First of all, FIG. 4b shows a flow chart showing basic actions of the present invention as performed on computer arrangement 10. Before explaining the actions of FIG. 4b in detail, they will be briefly mentioned here.

In action 30, the computer arrangement 10 receives the data from the range sensors 3(*i*) and the cameras 9(*j*), as well as position/orientation and time data from the position/orientation determination device onboard the MMS.

Figure 5:
FIG. 5 shows an image of a non-moving object.

In action 32, the processor identifies different objects like the car shown in FIG. 5 in the data derived from the range sensors 3(*i*).

In action 36, computer arrangement 10 produces masks for one or more objects based on the data from the range sensor data.

In action 38, computer arrangement 10 maps these masks on corresponding objects in the pictures as taken by the one or more cameras 9(*j*), taking into account the different time and location of the measurements and also the movement of the objects.

In action 40, computer arrangement 10 processes at least a portion of the picture within the boundaries indicated by the mask such as to make privacy sensitive data within that object illegible.

Now, each of these actions is explained in more detail. To that effect reference is made to FIGS. 5-9. FIG. 5 shows a picture with some cars on it. The picture of FIG. 5 has been taken with camera 9(2) The first visible car, present within a dotted rectangle, has a license plate of which the details are clearly visible. From a privacy point of view, such details must be removed. The program as running on computer arrangement 10 identifies the objects or, in an embodiment, portions within the objects that may relate to privacy sensitive information and should be processed. In the case of FIG. 5, the program identifies either the whole car or the license plate and processes the whole car or the license plate in the picture to make it illegible. FIGS. 6-9 explain how this can be done.

Figure 6:
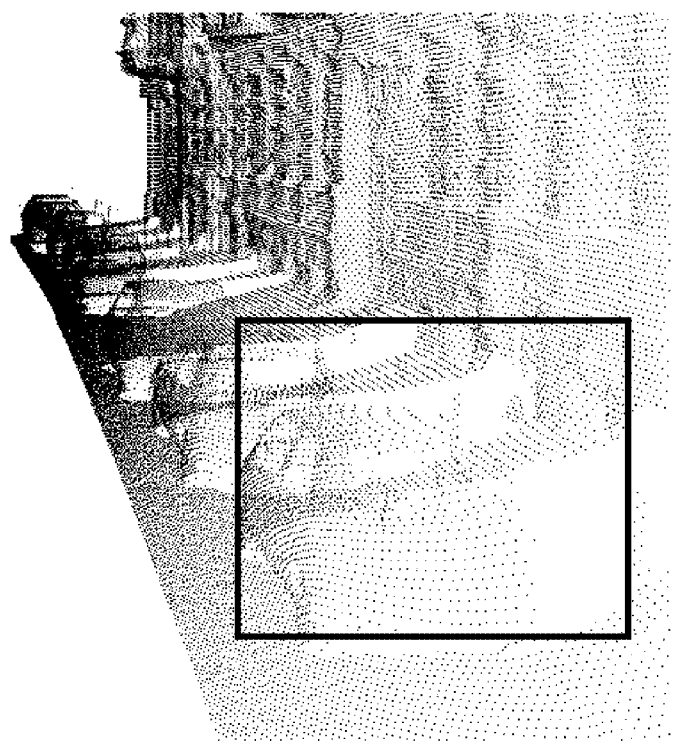
FIG. 6 shows an example of range sensor data obtained by one of the range sensors relating to the same scene as visible on the image of FIG. 5.

FIG. 6 shows a picture of the same scene as shown in FIG. 5 but as taken by range sensor 3(1). The range sensor's scanning points include distance data relating to the distance between the range sensor 3(1) and the car.

As indicated in action 30 of FIG. 4*b*, the data shown in FIGS. 5 and 6 is transmitted to the computer arrangement 10. Apart from the data shown in these FIGS. 5 and 6, the location and orientation data as a function of time and as obtained by the position determination/orientation device onboard the MMS is transmitted to the computer arrangement 10. This also holds for the position of the camera(s) 9(*i*) and range sensors 3(*j*) relative to the position of the position determination/orientation device. The transmission of the data to computer arrangement 10 in action 30 may be done via any known method, for instance, via a wireless transmission of the data as obtained by the MMS in car 1 or via an intermediate medium like a DVD, a Blu Ray disk, a memory stick, etc.

In action 32, objects are identified in the range sensor data. Preferably, the computer arrangement 10 applies a façade prediction method, i.e., a method to identify locations where building façades are located. As indicated above, location data as to where such building façades are can be obtained by using a method described and claimed in co-pending patent application PCT/NL2006/050264. Other techniques to identify the location of building façades can, of course, be used within the context of the present invention. If so, the data relating to building façades in the images taken by the camera(s) 9(*i*) may be disregarded from any further processing, such as removing privacy sensitive data from these images. Also data relating to ground can be removed in a straight forward way. For instance, the computer arrangement 10 can use the fact that the MMS is moving on the ground and it therefore knows where the ground is in relation to the camera(s) 9(*i*) and the range sensors 3(*j*). So ground can be approximated as a plane on which the MMS moves. If desired, slope measurements can be taken into account too. Stationary and moving objects between the mobile mapping system and such façades can be found in the points clouds obtained by the range sensor(s) 3(*j*) which allows mapping an image pixel to a proper space position.

It is observed that range sensor data can be used by the processor to augment a photogrammetrical method for the determination of image point positions of objects relative to the mobile mapping system. In such an action, moving objects can be detected as well as stationary objects. Also, a trajectory as followed by such a moving object can be estimated.

Preferably, the program applies a pre-filtering process to the range sensor data to identify objects of interest. That is more suitable and efficient, needing less processing time since range sensor data relating to an object will, in general, comprise less data than camera image data relating to the same object. The pre-filtering process may be based on dynamic features of the object, on the size of the object and/or position characteristics of the object. This may result in one or more selected objects that need further processing. Such further processing will be performed on the camera image data of the same object and may include applying any known scene decomposition technique to identify portions within the image that, for instance, relate to text and/or human faces. Such image detection techniques are known from the prior art and need no further explanation here. Examples are: clustering and/or RANSAC based searching models.

Figure 7:
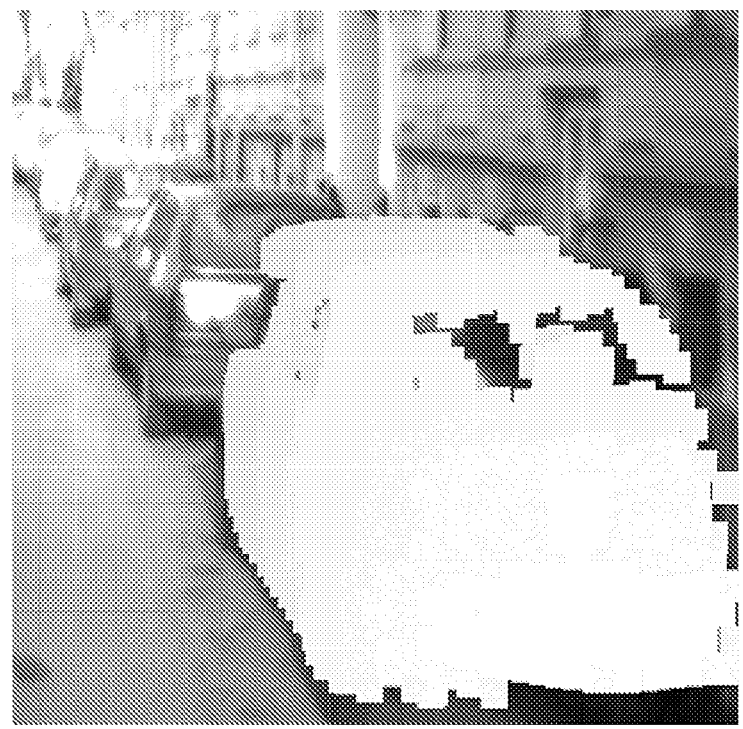
FIG. 7 shows how the data of FIG. 6 can be used to produce a mask.
Figure 10:
FIG. 10 shows an example of a picture taken by one of the cameras.

The range sensor's scanning points include distance data relating to the distance between the range sensor 3(1) and the car of FIG. 10. Based on this, and the other collected measurements, the range sensor's scanning points can be processed by computer arrangement 10 to identify where the car is as a function of time, as well as its velocity vector. As indicated in action 36, the computer arrangement 10 then determines the 3D trajectories of objects, parameterized by time so that the positions are associated with points from the image collected by camera(s) 9(*i*) to produce a mask that can be used to blur the car in the picture shown in FIG. 10 (or perform any other suitable image processing technique) in order to obtain the situation that no privacy sensitive data is present anymore in the picture of FIG. 5. The position of the mask would coincide with the position of the range sensor's scanning points relating to the car as transformed as to location to the image of camera 9(2). Such a mask is shown in FIG. 7.

Figure 8:
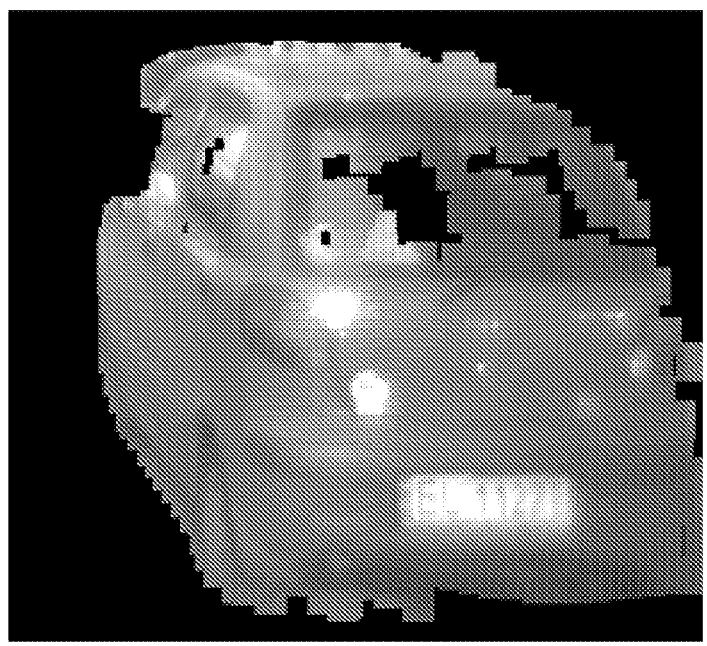
FIG. 8 shows how the mask of FIG. 7 can be used to identify an object in the image shown in FIG. 5.

In action 38, the computer arrangement 10 maps this mask on the image as shown in FIG. 5. As shown in FIG. 8, in this way, the computer arrangement 10 uses the mask to establish a boundary of the car in the image of FIG. 5.

Within that boundary, in action 40, the computer arrangement 10 can perform any desired image processing technique to establish any desired result as to the car within that boundary. For instance, it is possible to remove such a car (or any other object) completely from the image if there are enough overlapping images or if there is other information of the scene concerned such that the scene can be reproduced without the object being visible at all. So, in this embodiment, the computer arrangement 10 removes the object image data in the image data, and replaces the object image data in the scene as photographed by the camera 9(2) by data that would have been visible by the camera 9(2) if the object would not have been present.

Figure 9:
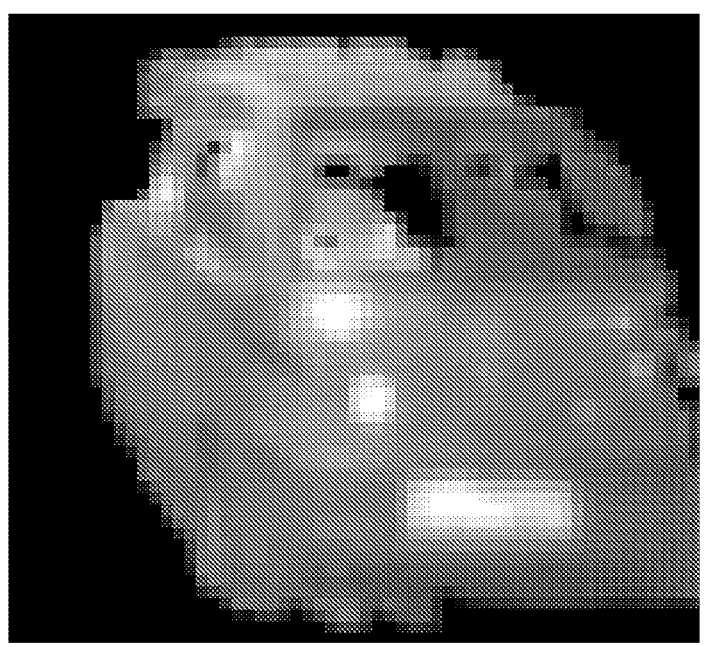
FIG. 9 shows the result of blurring the image of the object shown in FIG. 8.

Another image processing technique is blurring the image relating to that object such that privacy data is not visible anymore. This is shown in FIG. 9. However, other image processing techniques having the effect of making at least a portion of the image invisible/unrecognizable may be used, like defocusing that portion or substituting that portion by a standard image portion not showing any privacy details. For instance, a complete car may be substituted by an image of a standard car without a license plate. Or, if the license plate has been identified within the picture of the car the license plate may be blurred only or be substituted by a white plate only or by a plate with a non-private license number. "Pixelat" may be a suitable, alternative technique to be used, which divides pixels in a bitmap into rectangular or circular cells and then recreates the image by filling those cells with the minimum, maximum, or average pixel value, depending upon the effect that was selected.

In an embodiment, the processor 11 is arranged to use image processing analysis techniques to identify sub-objects within the object that comprise privacy sensitive data or other data to be removed. For instance, the program running on processor 11 can be arranged to identify faces of people by looking for face characteristics like eyes, ears. noses, etc. Programs to do so are available on the market, for instance as available in Intel image processing library. Alternatively or additionally, the program running on processor 11 can be arranged to identify portions with text. Programs to do so are available on the market too, for instance, Microsoft provides an image processing library that can be used here. Other techniques can be found as well.

Alternatively or additionally, the program running on processor 11 can be arranged to identify portions with text. Programs to do so are available on the market too, for instance, Optical_character_recognition provides an image processing library that can be used here. Programs do exist that recognize (characters on) license plates on cars. In this way, license plates and announcements that one wishes to remove or blur can be identified. Privacy sensitive data that one may wish to remove or blur may also relate to private telephone numbers.

It is observed that the camera(s) 9(j) will continuously take images of the surroundings of the MMS. In many cases this will result in several, consecutive images with overlapping parts of a scene. So, there may be several images having the same object in them. An advantage of the present invention is that it renders information as to where the object is in all these images. The image processing technique need only be applied once on the object in one of these images (typically the one taken first in time) instead of on the same object in all those images. Then, the processed object can be used in any of the other images too. This reduces processing time. If N objects need be identified and processed in K subsequent images, using the invention results in object analysis for these N objects only once, i.e., as performed by computer arrangement 10 on the range sensor data. The computer arrangement 10 need not repeat this for all K subsequent images.

In the example of FIGS. 5-9, the car is an object standing still, parked along the street. The image shown in these figures is the right portion of the image as has been taken by front looking camera 9(2). The object, once identified, is processed as to amend information in it that should not be recognizable anymore. FIGS. 10-21 relate to another example in which an object is present that is moving relative to the fixed world. Again, the image shown in these figures is the right portion of the image that has been taken by front looking camera 9(2). The example relates to a walking person that is present in the scene as the MMS moves past and hence is present in a picture taken by the camera 9(2). That person needs to be identified for the purpose of processing at least the portion in the image relating to his face such that it will not be recognizable anymore and hence that persons privacy is protected.

Figure 11:
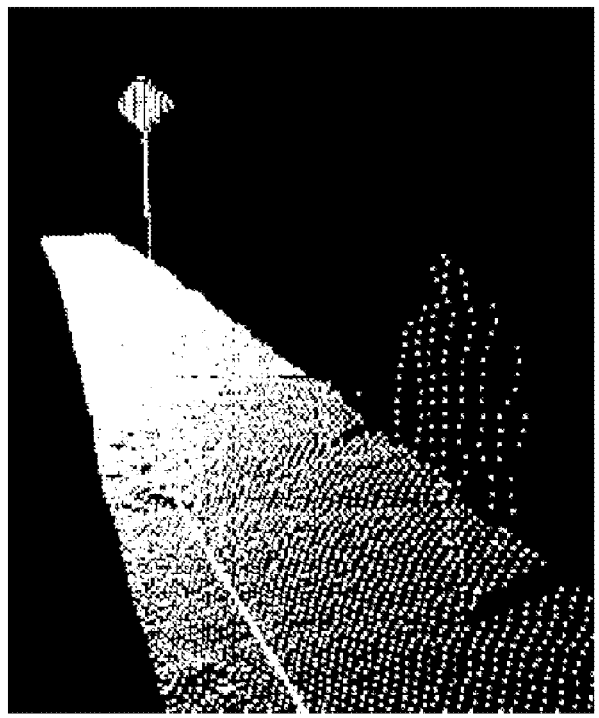
FIG. 11 shows an example of range sensor data obtained by one of the range sensors relating to the same scene as visible on the image of FIG. 10.

FIG. 10 shows a person's picture taken by camera 9(2) on the front side of car 1. The camera 9(2) takes a picture of the person earlier than any of the range sensors 3(1), 3(2). For instance, range sensor 3(1) has also sensed the person but slightly later in time. FIG. 11 shows scanning points as detected by range sensor 3(1). Some of these scanning points relate to the person also visible in FIG. 10. A comparison of the FIGS. 10 and 11 will show that there is a shift between the image of the person in FIG. 10 and the range sensor's points relating to the same person as shown in FIG. 11.

Figure 12:
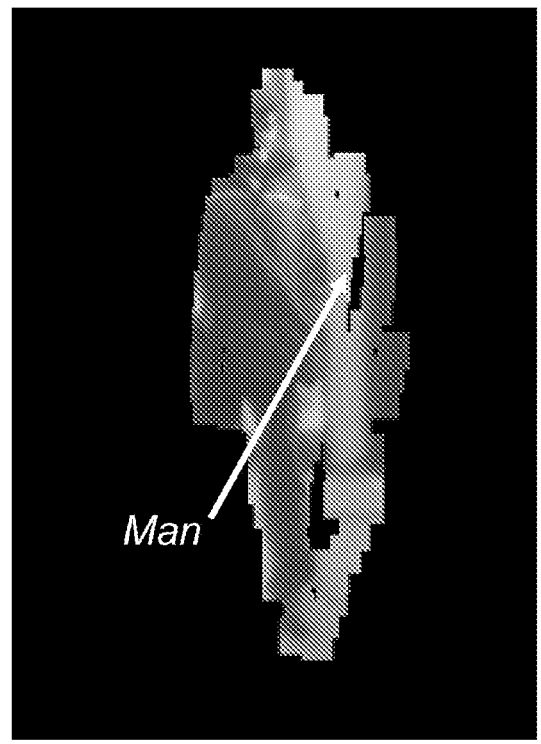
FIG. 12 shows how the data of FIG. 11 can be used to produce a mask.
Figure 13:
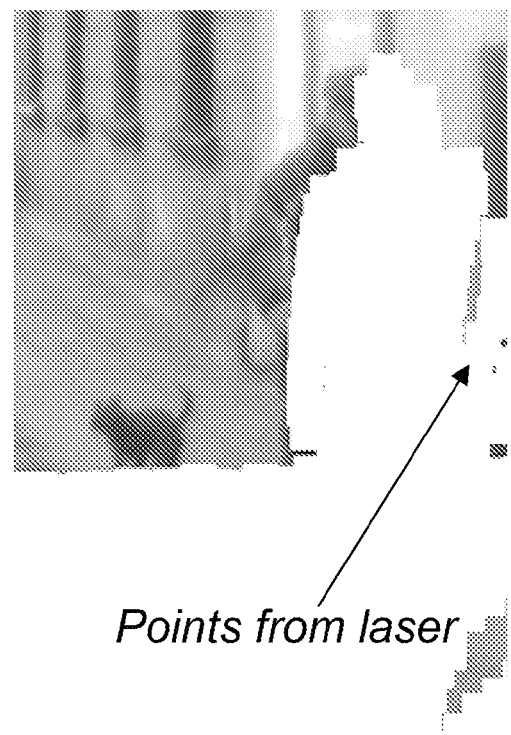
FIG. 13 shows how the mask of FIG. 12 can be used to identify an object in the image shown in FIG. 10.

The range sensor's scanning points include distance data relating to the distance between the range sensor 3(1) and the person. Based on this, and the other collected measurements, the range sensor's scanning points can be processed by computer arrangement 10 to identify where the person is. For a stationary object, the computer arrangement 10 may then adjust the laser scanner points of the object to the same location as seen in the image collected by camera 9(2) to produce a mask that can be used to erase the person from the picture shown in FIG. 10 (or perform any other suitable image processing technique) in order to obtain the situation that no privacy sensitive data is present anymore in the picture of FIG. 10. The position of the mask would coincide with the position of the range sensor's scanning points relating to the person as transformed to the image of camera 9(2). Such a mask is shown in FIG. 12. However, if the object, in this case a person, was moving, then the computer arrangement 10 would erase information about the person based on the range sensor's scanning points and a portion (i.e., the left portion) of the person would remain on the image. This is shown in FIG. 13. This is because the person has moved between the time of the camera image and the time of the laser scanning.

It is observed that there have been demonstrated systems with cameras that are collocated and synchronized with laser scanners such that they provide a direct correlation between range sensor data and image data. Other systems on the market, comprise z-distance augmented cameras images by means of merging images from special infrared cameras with data obtained from normal CCD sensors. Such systems, however, have a low resolution and high price. For moving objects, the present invention relates to a much more generic solution and still obtains proper mapping of point clouds from a range sensor to images from a camera by adjusting for the motion of the object using the estimated short-time trajectory.

So, there is a desire to not only produce such a mask based on the range sensor's data but also to determine motion trajectory data defining the amount and direction of movement of an object visible in at least one image taken by at least one of the cameras 9(i) between the time that the object was photographed by the camera and the time that the object was scanned by one of the range sensors 3(j). Below, it will be explained how such a motion vector can be determined by using at least two range sensors 9(i). In the explanation below, it is assumed that in view of the short time scale involved, the motion of objects is linear. However, the invention is not restricted to this embodiment. The motion of the objects may alternatively be estimated as a non-linear trajectory where such a trajectory is, for instance, determined by scans produced by more than two range sensors 3(*j*).

Figure 14:
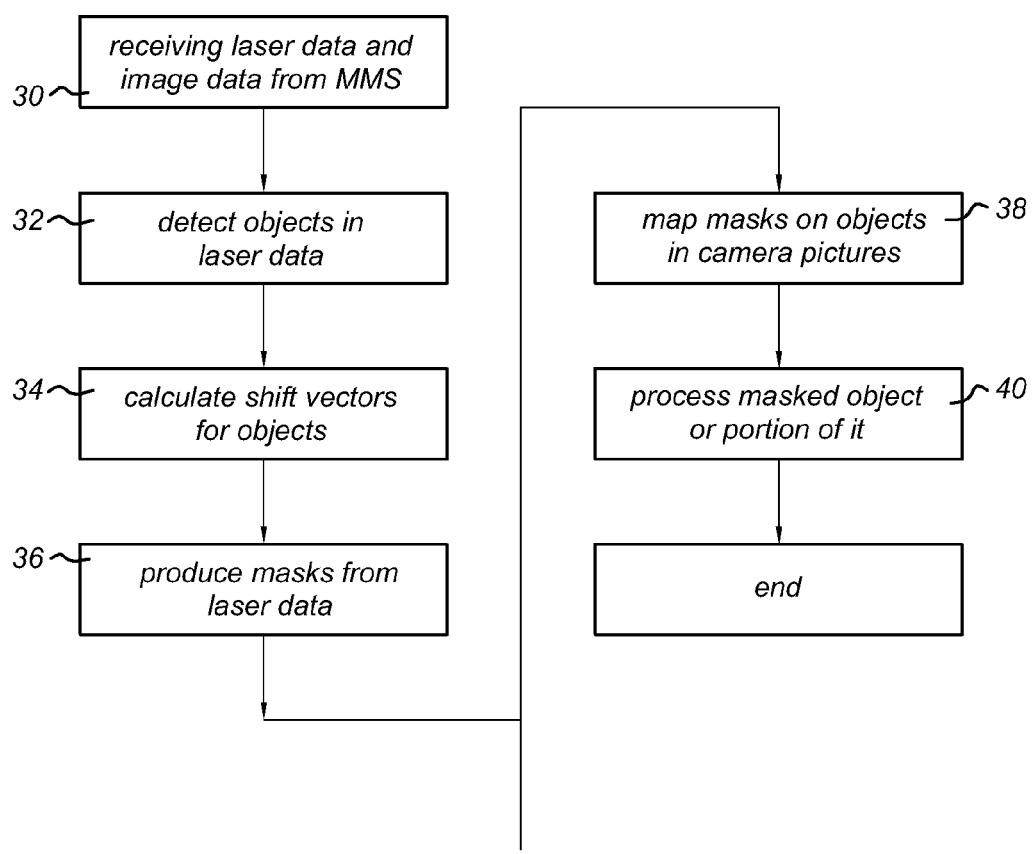
FIG. 14 shows a flow chart of a basic process in accordance with an embodiment of the invention.

First of all, FIG. 14 shows a flow chart showing basic actions of the present invention as performed on computer arrangement 10. The method actions as shown in FIG. 14 are largely the same as in FIG. 4*b*. The difference is a method action 34 between actions 32 and 36. In action 34, motion vectors for one or more moving objects are calculated by computer arrangement 10. Moreover, in action 38, computer arrangement 10 maps the masks as produced in action 36 on corresponding moving objects in the pictures as taken by the one or more cameras 9(*j*), taking into account the different location of the measurements and also the movement of the objects.

Now, especially action 34 is explained in more detail.

Actions 30 and 32 have been explained above with reference to FIG. 4*b*.

For calculating motion trajectory for objects, as performed in action 34, the assumption is made that a moving object does not change its speed and direction of travel to a large extent between the times the moving object was photographed by one of the cameras 3(*j*) and sensed by two or more of the range sensors 9(*i*). So, the motion vector is assumed to be substantially constant during that time. One could say that a "short time trajectory approximation" is used which is a very good approximation in view of the short time period involved between successive pictures and scans. Therefore, the motion vector's magnitude and direction can be estimated by determining the motion vector from successive scans from two different range sensors 9(*i*).

It is observed that, in an alternative embodiment, three or more range sensors may be used. If so, more than two range sensor scans can be used to identify movement of an object resulting in a higher order approximation of the trajectory of movement of the object than obtained by using two range sensors.

Figure 15A:
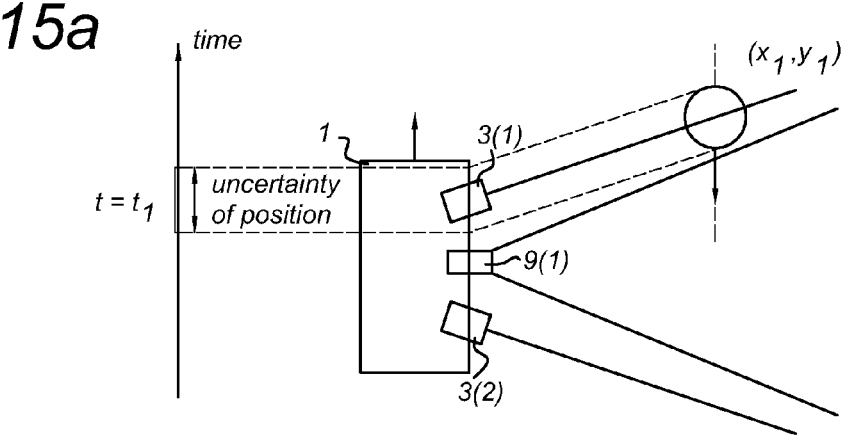
FIGS. 15a-15c show the position of an object relative to a car provided with a camera and two range sensors at successive moments in time.
Figure 15B:
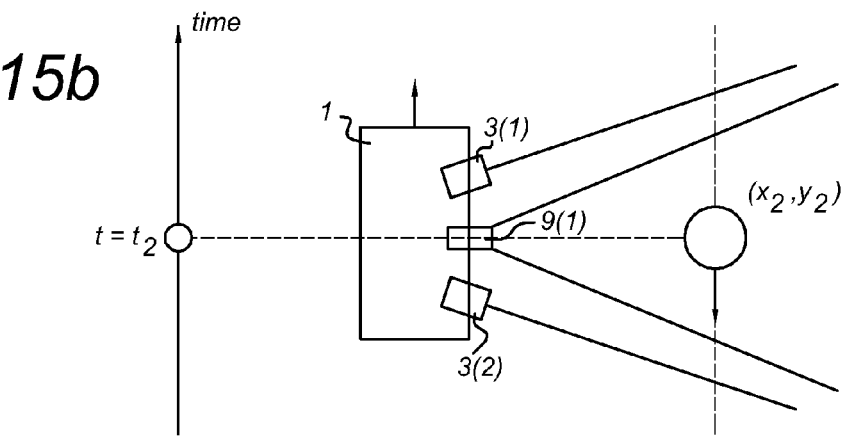
Figure 15C:
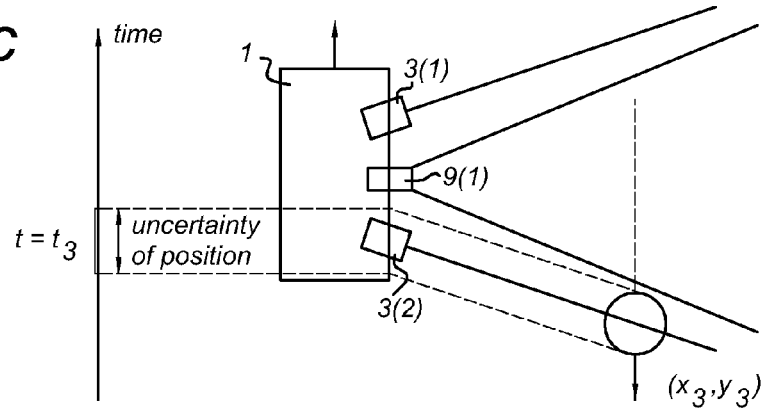

When an object is moving and was first scanned by a range sensor 3(1) and then by range sensor 3(2), then the object's position should be different between both scans. This is schematically shown in FIGS. 15*a*, 15*b*, 15*c*. In FIG. 15*a*, at time t1, the object is seen by range sensor 3(1). In FIG. 15*b*, at time t2, which is later than time t1, the object is not seen by any of the range sensors 3(*i*) but is only in the field of view of camera 9(1). In FIG. 15*c*, at time t3, which is later than time t2, the object is in the field of view of range sensor 3(2).

It is observed that FIGS. 15*a* and 15*c* show "uncertainty of position" regions indicating that the range sensors 3(*i*) may not identify the location of the object with a 100% accuracy. This is due to the fact that a range sensor, for instance a laser scanner, needs to scan the object several times to identify it. This takes some time. In this time period the object may move itself. As will be explained with reference to FIG. 22 below, fast moving objects may be detected to be larger than they are in reality. Using the concept of mass centers to identify movement may then result in an error which, however, can be corrected by a shape correction technique that will be explained hereinafter.

Below it will be explained how the range sensors scanning data can be used by computer arrangement 10 to derive the object's motion vector. Having derived this, the computer arrangement 10 can compute the object's speed and the object's position. The problem is assumed to be only 2D because one may assume that most objects on a road move only on a plane. Of course, the principles of the present invention can be extended to include "flying" objects, i.e., objects that move but are not contacting the ground.

A first scene scanned by the range sensor 3(1) is compared with a second scene scanned by the range sensor 3(2). If the object has moved then it cannot be in the same position in the second scene as the position in the first scene.

Comparing scans of two range sensors points clouds may be performed by computer arrangement 10 in the following way. First of all, the computer arrangement 10 calculates two sets of points clouds representing differences between the points clouds sets:

DIFF1=scan1−scan2;

DIFF2=scan2−scan1;

where: scan2=points cloud in scan of second range sensor 3(2)

scan1=points cloud in scan of first range sensor 3(1)

It is observed that before performing this set operations the points of the points clouds are associated with their correct location. Then, performing the equations renders two sets of points clouds representing moving objects at two different moments in time. Since in reality moving objects are spatially separate also corresponding portions of these two sets of points clouds are spatially separate which allows the computer arrangement 10 to effectively decompose them into point sets representing separate moving objects. By applying these operations in both DIFF1 and DIFF2 the computer arrangement 10 obtains two sets of points clouds representing the same objects.

Any decomposition technique known to a person skilled in the art may be applied. In general, the following technique may be used. Point clouds in a range sensor scan of the first range sensor 3(1) are separated into individual point clouds where each individual point cloud relates to a single object. To do so, points are grouped (clustered) together that have a similar placement in plane absolute world coordinates and are within a range distance from each other, which is adaptively determined for each group of points, depending on sequence positions in scans and or distance to the range sensor and the average distance to points belonging to other group is significantly different as moving object shall be specially separated.

Detected objects in the first and second scenes, as resulting from a decomposition method, are analyzed by comparing object characteristics in both scenes to find the same object in both scenes. Each group of points is analyzed as to its shape. The computer arrangement 10 calculates for each group whether they fit to a certain basic shape, like a box, a cylinder, a sphere, a plane, etc. For each group, the group is substituted by such a basic shape and the computer arrangement 10 stores basic features of the basic shape like height, diameter, width, etc. Then, computer arrangement 10 repeats the same procedure for the scan made by the second range sensor 3(2). The computer arrangement 10 is now able to compare the detected objects in the two scans by comparing the basic shapes present in both scans and then match or fit different objects in both scans.

A variety of known techniques can be used by computer arrangement 10 to determine matching pairs in those two sets. For example, a modified Hausdorff distance measurement extended to 3D can be applied.

Each object in the scenes has a characteristic point which is present in all scenes. A suitable characteristic point of an object is, for instance, a center of mass of a shape delimiting an object which can be calculated based on a subset of points clouds identified as belonging to such an object. Some shape characteristics of the object indicating, for instance, the object's proportion may be added as characteristic points. When the object is a person the person may be approximated by a cylinder (with diameter and height corresponding to averages sizes of humane body). In a crowd of people the people may be so close to one another that the computer arrangement 10 is unable to separate individuals from the crowd. Then, such a crowd may be analyzed as one single object. In this single object no individual faces can be detected. Still, privacy sensitive data may need to be removed from an image showing such a crowd. This can be solved by blurring the crowd as a whole. Alternatively, the image portion relating to a crowd may be pixelized. As a further alternative, even in crowds, face detection techniques as referred to above may be used to identify face portions in the images relating to crowds, followed by an image processing technique to blur those faces, to substitute them by some kind of standard face pictures, etc. If automatic image processing does not result in an acceptable result, manual image processing may alternatively be performed.

In most cases, there is no ambiguity as to fitting the basic shapes detected in a first scan by range sensor 3(1) to basic shapes detected in the second scan by range sensor 3(2). If there is ambiguity that may be solved by extending this method with object recognition techniques applied to candidates for matching objects in the images portion (Region of Interest) and comparing image properties in color space for ROI of each object in each of images as made by the camera(s) 9(j). If ambiguity remains, manual intervention may be applied as well.

Then, the absolute positions of the object, i.e. the positions of the mass centers in both scenes are determined by computer arrangement 10. How a mass center can be calculated will be explained hereinafter with reference to FIGS. 16 and 17.

The absolute positions of the object can be determined in any known way from the position data also received from the MMS which position data is linked to the times the cameras 9(j) took pictures and the range sensors 3(i) made scans, as is known to persons skilled in the art. Calculating absolute positions from the received MMS data can be performed in the way as explained in detail in International Patent Application PCT/NL2006/000552.

The motion vector for an object is computed by computer arrangement 10 as a difference between two absolute positions of the same object in the first scene and second scene. The object's position in the scene may relate to the position of the object's mass center in this scene. The motion vector can be used by computer arrangement 10 to compute the object's position at any time, assuming that the object's speed did not change rapidly, which is a valid assumption in the time period t1-t3 and also at times close to this period. As observed above, when there are several moving objects in a scene, some ambiguity may result in analyzing which mass center relates to which object. When starting the computation of the motion vectors it is assumed that this ambiguity has been solved and that all objects have been identified correctly, for instance by using point cloud characteristics, or the like, as explained above.

Position $(x_2, y_2)$ from FIG. 15b is computed by computer arrangement 10 while using the following calculations.

The computer arrangement 10 uses the following data:

$(x_1, y_1)$=absolute position of the object at time t1 as calculated by computer arrangement 10 from the position data received from range sensor 3(1), which are relative to the car 1, and the absolute position data of the car 1 at time t1 as calculated from the position determination device shown in FIG. 1; a suitable method to calculate the position of car 1 using the position determination device as shown in FIG. 2 is described in International patent application PCT/NL2006/000552, however, other methods may be used.

$(x_3, y_3)$=absolute position of the object at time t3 as calculated by computer arrangement 10 from the position data received from range sensor 3(2), which are relative to the car 1, and the absolute position data of the car 1 at time t3 as calculated from the position determination device shown in FIG. 1;

$t_1$=time at which the object was sensed by range sensor 3(1); this time has been recorded by the microprocessor in the car 1 and has, later, been stored in the memory of computer arrangement 10 too;

$t_2$=time at which the object was photographed by camera 9(1); this time has been recorded by the microprocessor in the car 1 and has, later, been stored in the memory of computer arrangement 10 too;

$t_3$=time at which the object was sensed by range sensor 3(2); this time has been recorded by the microprocessor in the car 1 and has, later, been stored in the memory of computer arrangement 10 too;

In the calculations, it has been assumed that the speed of car 1 is substantially constant during the period t1-t3.

The computer arrangement 10 calculates the object's position $(x_2, y_2)$ at time t2 as follows. It starts with a generally known equation for calculating a speed V of the object from a traveled distance $\Delta s$ during a time $\Delta t$:

$$V = \frac{\Delta s}{\Delta t},$$

The speed V can be seen to be the motion vector relating to an object. Decomposing V in x, y components $(V_x, V_y)$, $\Delta s$ in x, y components $\Delta s_x$, $\Delta s_y$, and substituting $\Delta t$ by t3-t1 renders:

$$V_x = \frac{\Delta s_x}{\Delta t} = \frac{x_3 - x_1}{t_3 - t_1}$$

$$V_y = \frac{\Delta s_y}{\Delta t} = \frac{y_3 - y_1}{t_3 - t_1}$$

From this, $(x_2, y_2)$ can be derived as follows:

$$x_2 = V_x \cdot (t_2 - t_1) + x_1 = \frac{x_3 - x_1}{t_3 - t_1} \cdot (t_2 - t_1) + x_1$$

$$y_2 = V_y \cdot (t_2 - t_1) + y_1 = \frac{y_3 - y_1}{t_3 - t_1} \cdot (t_2 - t_1) + y_1$$

The positions $(x_i, y_i)$ as calculated above relate to a mass center of the object concerned. The assumption is made that the mass is distributed even over the object concerned and that the shape of the object has not changed substantially. If this is not the case, the calculated mass center is in reality an object center. For the purpose of calculating the motion vector this does not matter.

Figure 16:
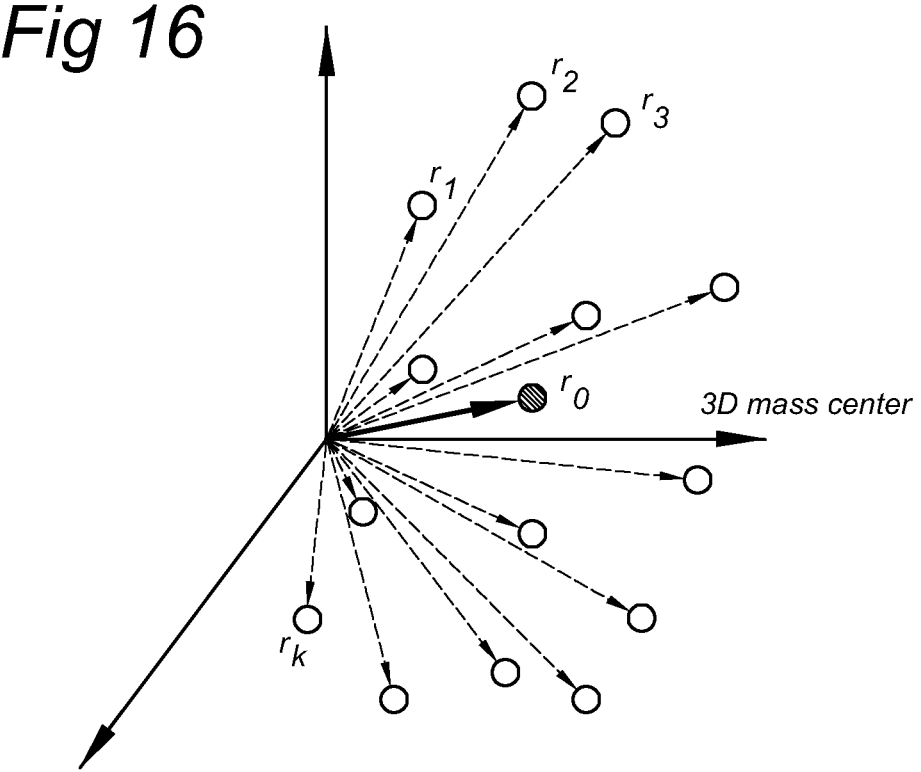
FIG. 16 shows a cloud of range sensor measurement points of an object.
Figure 17:
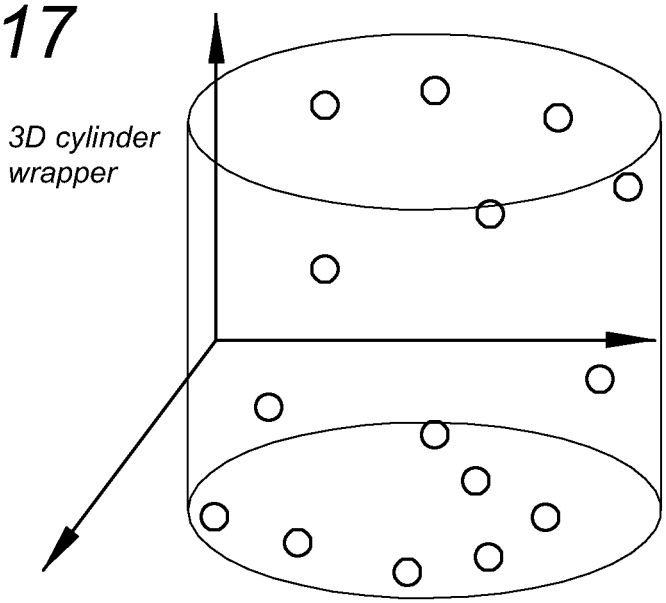
FIG. 17 shows a cylinder as used in a model to calculate a center of mass of an object.

All scanning data from a range sensor 3(i) relating to one specific object at a moment in time $t_i$ can be said to form a "points cloud" of measurement points. FIG. 16 shows such a points cloud. Each scanned point relating to one object (as obtained by the decomposing method as explained above and as performed by computer arrangement 10) is indicated with a small circle at a distance $r_i$ from an arbitrary origin, for instance defined by a position defined for car 1. Computer arrangement 10 calculates for each such points cloud a mass center. For objects like a human being, computer arrangement 10 also calculates a cylinder approximating that human being, as shown in FIG. 12. Other objects can be approximated by other external shapes. The external shape and mass center together form a description of the object.

A geometric mass center $\vec{r}_0$ of the points of such a cloud follows from $$\vec{r}_0 = \frac{\sum_k \vec{r}_k}{k}$$

Figure 18:
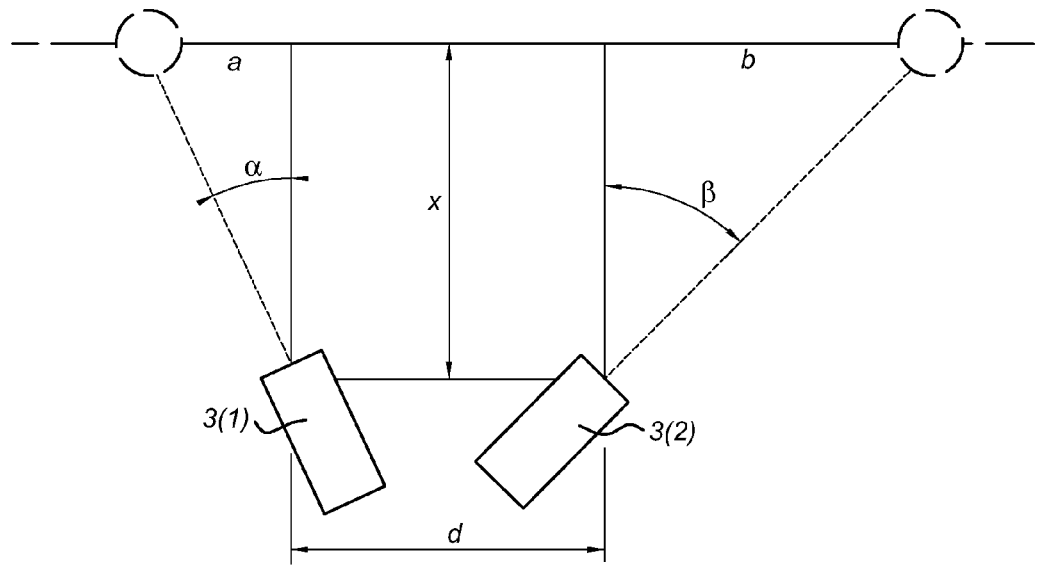
FIG. 18 shows two range sensors directed in different directions.

It is observed that the range sensors 3(i) may look in different directions, as schematically indicated in FIG. 18. In FIG. 18, the dotted circles indicate the object. Range sensor 3(1) looks in a direction having an angle α relative to the direction of view of camera 9(1), and range sensor 3(2) looking in a direction having an angle β relative to the direction of view of camera 9(1). One can show that the position of an object can be calculated most accurately by computer arrangement 10 from data received from the range sensors 3(i) when both angles α, β are 0°. However, the invention is not restricted to this value. In fact, in order to compute the speed accurately, the distance indicated by a+d+b should be as large as possible while remaining consistent with the assumption that the time of the trajectory is short.

Figure 19:
FIG. 19 shows how a moving object is identified in an image while using a mask as shown in FIG. 12 and using speed estimation of the object.

In action 36, the computer arrangement 10 produces a mask defined by at least a portion of the scanning points within one cloud relating to one object. FIG. 19 shows such a mask for a cloud of pixels relating to the person shown in FIG. 10. The mask is derived from one cloud of pixels relating to an object associated with the same object in the image. The mask used has a fixed shape which works fine for those objects that, even though they are moving, substantially do not change their shape during the timescale involved which has turned out to be a suitable assumption for those cases where objects are only moving slowly. If objects are moving fast, their shape as detected by the range sensors 3(i) should first be corrected by the computer arrangement 10. How this can be done will be explained with reference to FIG. 22 below.

Figure 20:
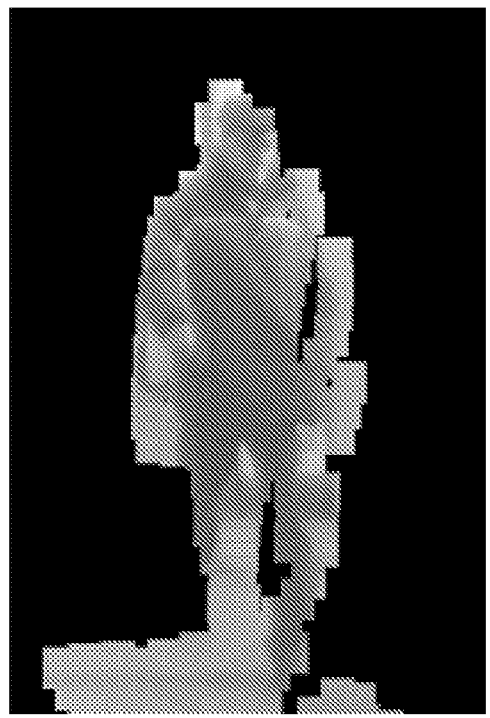
FIG. 20 shows the object as identified by the mask.

In action 38, the computer arrangement 10, while using the calculated motion vector, maps this mask on position ($x_2$, $y_2$) in the image as shown in FIG. 10. As shown in FIG. 20, in this way, the computer arrangement 10 uses the mask to establish a boundary of the object in the image of FIG. 10.

Within that boundary, in action 40, the computer arrangement 10 can perform any desired image processing technique to establish any desired result as to the object within that boundary.

Figure 21:
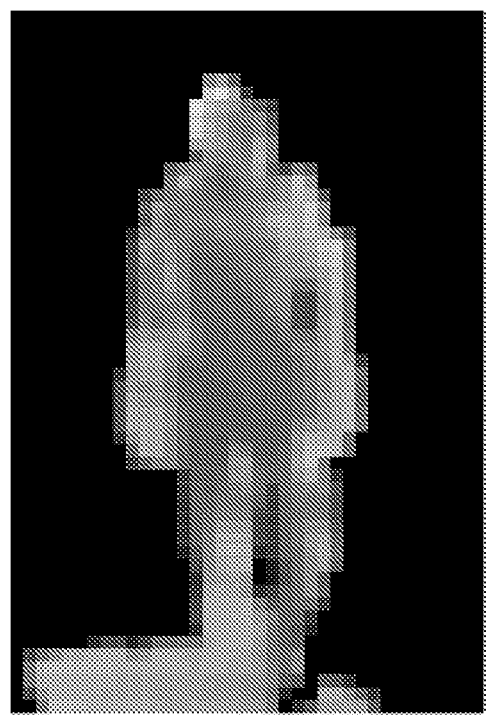
FIG. 21 shows the result of blurring the image of the object shown in FIG. 20.

As indicated above, one such image processing technique is blurring the image relating to that object such that privacy data is not visible anymore. This is shown in FIG. 21. However, again, other image processing techniques having the effect of making at least a portion of the image invisible/unrecognizable may be used, like defocusing that portion or substituting that portion by a standard image portion not showing any privacy details. For instance, a face of a human being may be substituted by a standard face of a puppet.

"Pixelat" may be a suitable technique to be used, as already observed with respect to FIG. 4b.

In an embodiment, the processor 11 is arranged to identify sub-objects within the moving object that comprise privacy sensitive data or other data to be removed. For instance, the program running on processor 11 can be arranged to identify faces of people by looking for face characteristics like eyes, ears, noses, etc. Programs to do so are available on the market. Microsoft provides an image processing library that can be used here. Other techniques can be found as well.

Alternatively or additionally, the program running on processor 11 can be arranged to identify portions with text. Programs to do so are available on the market too. Programs do exist that recognize (characters on) license plates on cars. Such programs are, for instance, used on road segments with speed limitation. In this way, license plates, telephone numbers and announcements that one wishes to remove or blur can be identified.

So far, it has been discussed how to deal with non-moving objects and moving objects. However, when moving objects move fast relative to the speed of the MMS itself the size of that object as observed by the range sensors 3(j) will deviate from its real size. For instance, a car that is passing the MMS or passed by the MMS is continued to be scanned by the range sensors 3(j) over a longer period of time than it would be if standing still or almost standing still. Thus, such a car appears longer than it is. The opposite effect happens if the car is moving in the opposite direction. This is not much of a problem for the pictures taken by the camera(s) 9(i) since the camera(s) have a high shutter speed: the pictures will show the real size of the car.

The difference between real size and the size of the car in the points cloud observed by the range sensors 3(j) results in a too small or too large mask as derived from the range sensor data. So, the program running on computer arrangement 10 has to compensate for this observed size error. This will be done in action 36.

Figure 22:
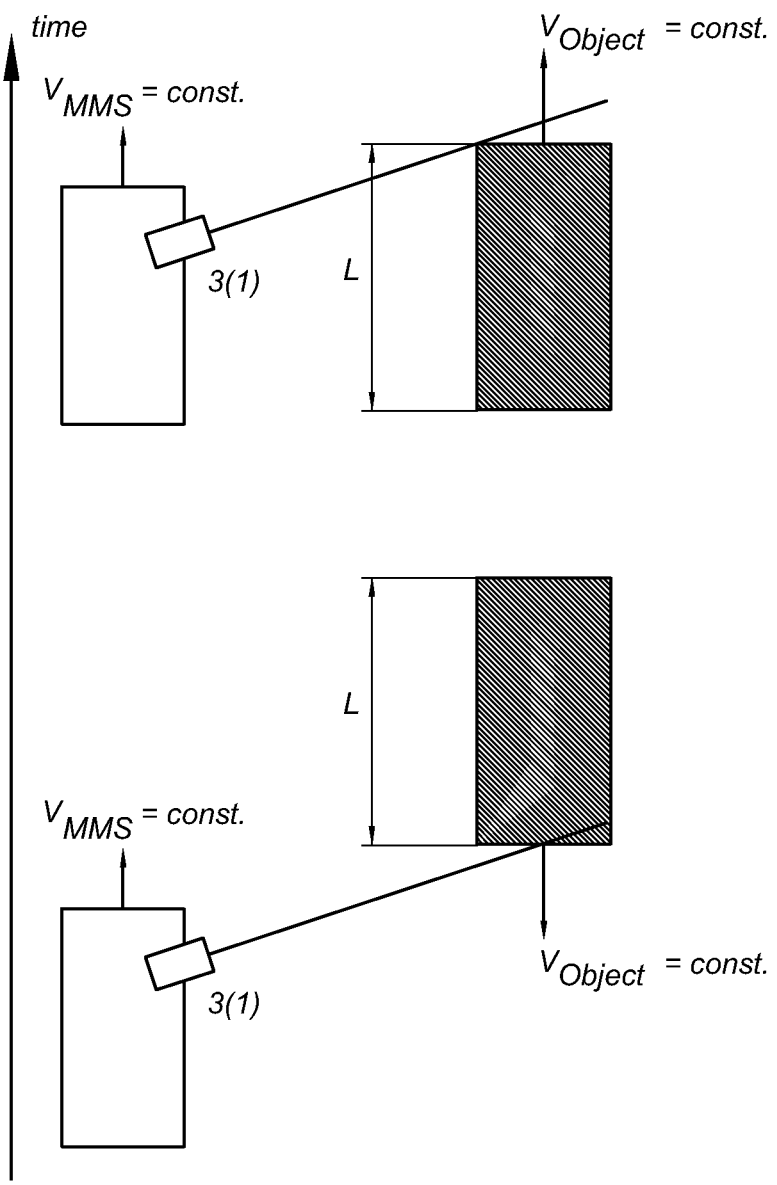
FIG. 22 shows how a real size and shape of a moving object can be determined.

FIG. 22 explains how the speed and size, and optionally shape, of a fast moving object can be determined. The upper part of the Figure relates to the MMS passing a car whereas the lower part of the Figure relates to a car passing in the opposite direction.

The observed length of a moving object is determined by a time of scanning $t_{scanning}$ by one of the range sensors. The upper part of FIG. 22 shows a situation where range sensor 3(1) detects a car for the first time. The time of scanning by the range sensor 3(1) is the time between the first detection and the last detection (the last detection not being shown in FIG. 22) by range sensor 3(1).

The real speed $V_{real}$ of the car is defined by:

$$V_{real} = V_{MMS} + V_{relative}$$

where:
  $V_{real}$=real speed of car
  $V_{MMS}$=speed of MMS as determined from position determination device data
  $V_{relative}$=relative speed of car to speed of MMS as computed while using identical formulae used for calculating speed of the person of FIG. 10

The observed length of the car $L_{observed}$ as calculated from the range sensor data and the position determination device data follows from:

$$L_{observed} = V_{MMS} \cdot t_{scanning}$$

The real length of the car $L_{real}$, however, follows from:

$$L_{real} = L_{observed} - L_{corr}$$

where $L_{corr}$ is a correction because of the car having a speed of its own, and is equal to:

$$L_{corr}=V_{real} \cdot t_{scanning}$$

So, the real length of the car follows from:

$$L_{real}=(V_{MMS}-V_{real}) \cdot t_{scanning}$$

Note that in this latter equation the real speed of the car $V_{real}$ should be deducted from the speed of the MMS if the car is driving in the same direction as the MMS and should be added if it is driving in the opposite direction. Whether the car is driving in the same or opposite direction follows from the speed calculation based on the data of the two range sensors 3(1), 3(2).

Once having established the real length of the car $L_{real}$, in action 36, the computer arrangement 10 takes this into account while calculating the mask. I.e., for instance, the computer arrangement multiplies the length of the mask by a factor F equal to:

$$F=L_{real}/L_{observed}$$

The mask thus obtained is used in action 38.

SUMMARY

Above, it has been explained that the invention relates to a determination of positions of objects, like façades, road furniture, pedestrians, and vehicles within an image taken by one or more digital cameras on a moving car, for instance, a MMS. One or more range sensors arranged on the car are used to produce a mask that can be used to identify objects in such an image and then to perform an image processing action on such objects or portions thereof. Sizes and trajectories of possibly moving objects in the images can be approximated using an arrangement comprising two or more range sensors, like laser scanners or other range sensors, attached to such a MMS that are producing scans of the same scenes as photographed by the camera(s) mounted on the MMS. While using, for instance, any known building/façade detection algorithm and identifying objects within the pictures taken by the camera(s) while using the range sensors data, and subsequently applying one or more image processing filters to such objects, the following advantages can be achieved:

1. Protection of privacy sensitive portions or other undesired portions on images by changing the resolution or other image visual characteristics of those portions.
2. Image portions relating to objects or portions thereof in one image after being processed as to undesired data in them, can be used in other MMS collected images showing the same object. So, any image processing action performed on an object need only be applied once and not anew in different images.
3. Static, as well as slow and fast moving objects in a range sensor points cloud can be distinguished. Their real length and real speed can be determined.
4. Objects in camera images can be accurately masked based on adjusting the laser scan detection of said image by the length and speed values determined and the time difference between the laser scan and image capture.
5. Unwanted objects in the area between the car and the façade can be removed and information from another image or from the current image can be processed to replace the foreground image.

The invention claimed is:

1. Computer arrangement comprising:
   a processor; and
   at least one memory connected to the processor, the at least one memory comprising a computer program comprising data and instructions arranged to allow said processor to:
   receive time and position data from a position determination device on board a mobile system, and receive first range sensor data from at least a first range sensor on board said mobile system, second range sensor data from a second range sensor on board said mobile system, and image data from at least one camera on board said mobile system;
   identify a first points cloud within said first range sensor data, relating to at least one object;
   identify a second points cloud within said second range sensor data, said second points cloud relating to said same at least one object;
   calculate a motion vector for said at least one object based at least in part on a first position of said at least one object in said first points cloud and a second position of said at least one object in said second points cloud, using a short time trajectory approximation;
   produce a mask relating to said object and based on said first points cloud and said second points cloud;
   map said mask on object image data relating to said same object as present in said image data from said at least one camera, said mapping comprising applying said mask to a location of said object in said image data that is determined using the motion vector; and
   perform an image processing technique on at least a portion of said object image data based on a location of said mask on said object image data, wherein said object image data comprises a plurality of images, each image of the plurality of images showing said object, wherein performing said image processing technique on at least said portion of said object image data involves performing said image processing technique for one of said plurality of images to form a processed object image, and substituting at least said portion of said object image data in other images of said plurality of images by said processed object image.

2. Computer arrangement according to claim 1, wherein said computer program is arranged to allow said processor to:
   calculate an observed size of said object based on one of said first and second range sensor data; and
   calculate said mask based on said observed length and said real length.

3. Computer arrangement according to claim 1, wherein said processor calculates said motion vector assuming that a speed and direction of motion of any object detected within said range sensor data from said at least first and second range sensor is substantially constant.

4. Computer arrangement according to claim 1, wherein said identifying said second points cloud comprises distinguishing said at least one object from a reference object fixed to the earth.

5. Computer arrangement according to claim 4, wherein said reference object is a building.

6. Computer arrangement according to claim 1, wherein said identifying said first points cloud comprises distinguishing said at least one object from a reference object fixed to the earth.

7. Computer arrangement according to claim 1, wherein said image processing technique includes at least one of blurring said at least one portion defocusing said at least one portion and substituting said at least one portion by image data.

8. Computer arrangement according to claim 1, wherein said computer program is arranged to allow said processor to identify said at least one portion by using at least one of an object recognition technique and a character recognition technique.

9. Computer arrangement according to claim 1, wherein said at least one portion includes privacy sensitive data.

10. Computer arrangement according to claim 1, wherein said object image data belongs to a certain scene, said image processing technique includes removing said object image data in said image data, and replacing said object image data in said scene by data that would have been visible in that scene if said object would not have been present.

11. Data processing system comprising:
the computer arrangement according to claim 1; and
a mobile system, said mobile system including:
a position determination device for providing said time and position and orientation data,
at least a first range sensor for providing said first range sensor data, and
at least one camera for providing said image data.

12. Computer arrangement according to claim 1, wherein said compensation is adjusted based on whether the object is moving towards or away from the computer arrangement.

13. Computer arrangement according to claim 1 further comprising determining at least one of a speed, size and shape of said object.

14. The computer arrangement according to claim 1, wherein the processor further determines a real length using the calculated real speed and uses the real length to compensate for the observed size error.

15. The computer arrangement according to claim 1, wherein the calculated real speed is deducted from a speed of the mobile system when the mobile system and object are traveling in opposite directions and wherein the calculated real speed is added to the speed of the mobile system when the mobile system and object are traveling in the same direction.

16. The computer arrangement according to claim 1, wherein the processor determines whether said object is moving fast relative to the mobile system based on a real speed calculation for the object and compensates for an observed size error when said object is moving fast.

17. Method of mapping first range sensor data from a first range sensor to image data from at least one camera, both said first range sensor and said at least one camera being located on a mobile system in a fixed relation to one another, the method comprising:
receiving time and position data from a position determination device on board said mobile system, receiving said first range sensor data from said first range sensor on board said mobile system, receiving second range sensor data from a second range sensor on board said mobile system, and receiving said image data from said at least one camera on board said mobile system;
identifying a first points cloud within said first range sensor data, relating to at least one object;
identifying a second points cloud within said second range sensor data, relating to said same at least one object;
calculating a motion vector for said at least one object based at least in part on a first position of said at least one object in said first points cloud and a second position of said at least one object in said second points cloud;
producing a mask relating to said object and based on said first points cloud and said second points cloud;
mapping said mask onto object image data relating to said same object as present in said image data from said at least one camera, said mapping comprising applying said mask to a location of said object in said image data that is determined using said motion vector and a short time trajectory approximation; and
performing an image processing technique on at least a portion of said object image data based on a location of said mask on said object image data, wherein said object image data comprises a plurality of images, each image of the plurality of images showing said object, wherein performing said image processing technique on at least said portion of said object image data involves performing said image processing technique for one of said plurality of images to form a processed object image, and substituting at least said portion of said object image data in other images of said plurality of images by said processed object image.

18. Non-transitory computer readable-medium comprising data and instructions that can be loaded by a computer, allowing said computer to perform the method according to claim 17.

19. The method of claim 17 further comprising determining whether said object is moving fast relative to the mobile system based on a real speed calculation for the object and compensating for an observed size error when said object is fast moving.

* * * * *